(12) United States Patent
Phillips et al.

(10) Patent No.: US 7,764,504 B2
(45) Date of Patent: Jul. 27, 2010

(54) HEAT TRANSFER SYSTEM FOR A RECEPTACLE ASSEMBLY

(75) Inventors: Michael J. Phillips, Camp Hill, PA (US); Randall Robert Henry, Harrisburg, PA (US); Keith McQuilkin Murr, York, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/804,121

(22) Filed: May 16, 2007

(65) Prior Publication Data

US 2008/0285236 A1 Nov. 20, 2008

(51) Int. Cl.
- H05K 7/20 (2006.01)
- F28F 7/00 (2006.01)
- H02B 1/01 (2006.01)
- G02B 6/36 (2006.01)
- H01R 13/64 (2006.01)

(52) U.S. Cl. .................. 361/715; 361/716; 361/704; 361/709; 361/831; 385/92; 439/374; 165/80.2; 174/15.2

(58) Field of Classification Search ............... 361/709, 361/715–716, 831; 165/80.2; 174/15.2; 439/374

See application file for complete search history.

(56) References Cited

U.S. PATENT DOCUMENTS

| | | | |
|---|---|---|---|
| 4,808,115 A | 2/1989 | Norton et al. | |
| 4,887,353 A | 12/1989 | Preputnick | |
| 4,903,402 A | 2/1990 | Norton et al. | |
| 5,241,453 A | 8/1993 | Bright et al. | |
| 5,357,404 A | 10/1994 | Bright et al. | |
| 5,833,472 A | 11/1998 | Bright | |
| 6,558,191 B2 * | 5/2003 | Bright et al. | 439/541.5 |
| 6,745,824 B2 * | 6/2004 | Lee et al. | 165/104.14 |
| 6,749,448 B2 * | 6/2004 | Bright et al. | 439/160 |
| 6,752,663 B2 * | 6/2004 | Bright et al. | 439/607 |
| 6,808,013 B2 * | 10/2004 | Lai et al. | 165/80.4 |
| 6,811,326 B2 * | 11/2004 | Keeble et al. | 385/92 |
| 6,816,376 B2 | 11/2004 | Bright et al. | |
| 6,893,293 B2 * | 5/2005 | Ice et al. | 439/607.2 |
| 6,909,608 B2 * | 6/2005 | Fan | 361/700 |
| 6,916,122 B2 * | 7/2005 | Branch et al. | 385/92 |
| 6,918,429 B2 * | 7/2005 | Lin et al. | 165/80.3 |
| 6,944,022 B1 * | 9/2005 | Kehret et al. | 361/690 |
| 6,980,437 B2 | 12/2005 | Bright | |
| 6,986,679 B1 * | 1/2006 | Aronson et al. | 439/374 |
| 7,003,230 B2 * | 2/2006 | Branch et al. | 398/135 |
| 7,028,758 B2 * | 4/2006 | Sheng et al. | 165/104.21 |
| 7,048,452 B2 * | 5/2006 | Malagrino, Jr. | 385/92 |
| 7,070,446 B2 * | 7/2006 | Henry et al. | 439/541.5 |
| 7,131,859 B1 * | 11/2006 | Zumbrunnen et al. | 439/487 |
| 7,145,773 B2 * | 12/2006 | Shearman et al. | 361/715 |
| 7,286,365 B2 * | 10/2007 | Sarno et al. | 361/721 |
| 7,317,617 B2 * | 1/2008 | Meadowcroft et al. | 361/715 |
| 7,355,857 B2 * | 4/2008 | Pirillis et al. | 361/715 |
| 7,371,965 B2 * | 5/2008 | Ice | 174/50 |

(Continued)

Primary Examiner—Jayprakash N Gandhi
Assistant Examiner—Bradley H Thomas (57) ABSTRACT

A receptacle assembly includes a housing that is configured to hold an electrical module. An energy transfer element, which is held by the housing, is positioned to directly engage the electrical module. The transfer element absorbs thermal energy produced by the electrical module. The receptacle assembly also includes a heat sink that is remotely located from the transfer element. A thermally conductive member extends between the heat sink and the transfer element to convey thermal energy therebetween.

19 Claims, 8 Drawing Sheets

U.S. PATENT DOCUMENTS

| | | | |
|---|---|---|---|
| 7,433,193 B2* | 10/2008 | Yee et al. | 361/715 |
| 7,457,126 B2* | 11/2008 | Ahrens | 361/716 |
| 7,511,947 B2* | 3/2009 | Leng et al. | 361/679.52 |
| 2002/0131122 A1* | 9/2002 | Anderl et al. | 359/152 |
| 2002/0131730 A1* | 9/2002 | Keeble et al. | 385/92 |
| 2003/0011990 A1* | 1/2003 | Lai et al. | 361/697 |
| 2003/0103336 A1* | 6/2003 | Brezina et al. | 361/743 |
| 2003/0141090 A1* | 7/2003 | Kruger et al. | 174/50 |
| 2003/0161108 A1* | 8/2003 | Bright et al. | 361/707 |
| 2003/0230398 A1* | 12/2003 | Lee et al. | 165/104.21 |
| 2003/0236019 A1* | 12/2003 | Hanley et al. | 439/372 |
| 2004/0027816 A1* | 2/2004 | Ice | 361/797 |
| 2004/0101257 A1* | 5/2004 | Kruger et al. | 385/92 |
| 2004/0203289 A1* | 10/2004 | Ice et al. | 439/607 |
| 2005/0152663 A1* | 7/2005 | Bench et al. | 385/147 |
| 2005/0190540 A1* | 9/2005 | Shearman et al. | 361/715 |
| 2005/0195565 A1* | 9/2005 | Bright | 361/688 |
| 2005/0195571 A1* | 9/2005 | Bulman-Fleming et al. | 361/704 |
| 2005/0226571 A1* | 10/2005 | Malagrino et al. | 385/92 |
| 2006/0098924 A1* | 5/2006 | Anderl et al. | 385/92 |
| 2006/0256521 A1* | 11/2006 | Yee et al. | 361/688 |
| 2006/0281357 A1* | 12/2006 | Chen et al. | 439/350 |
| 2006/0285806 A1* | 12/2006 | Ahrens | 385/92 |
| 2006/0291171 A1* | 12/2006 | Ahrens | 361/716 |
| 2007/0058347 A1* | 3/2007 | Tsai et al. | 361/703 |
| 2007/0183128 A1* | 8/2007 | Pirillis et al. | 361/715 |
| 2007/0243741 A1* | 10/2007 | Yang | 439/304 |
| 2007/0253168 A1* | 11/2007 | Miller | 361/719 |
| 2007/0272041 A1* | 11/2007 | Bench et al. | 73/865.6 |
| 2008/0019100 A1* | 1/2008 | Yang | 361/716 |
| 2008/0105411 A1* | 5/2008 | Cao et al. | 361/697 |

* cited by examiner

HEAT TRANSFER SYSTEM FOR A RECEPTACLE ASSEMBLY

BACKGROUND OF THE INVENTION

The invention relates generally to an electronic receptacle assembly, and more particularly, to a receptacle which is mounted on a circuit board and configured to have one or more transceiver modules plugged into the receptacle.

Various types of fiber optic and copper based transceivers that permit communication between electronic host equipment and external devices are known. The transceivers may be incorporated into modules that can be pluggably connected to the host equipment to provide flexibility in system configuration. The modules are constructed according to various standards for size and compatibility, one standard being the Small Form-factor Pluggable (SFP) module standard.

The SFP module is plugged into a receptacle that is mounted on a circuit board within the host equipment. The receptacle includes an elongated guideframe, or cage, having a front that is open to an interior space, and an electrical connector disposed at a rear of the cage within the interior space. Both the connector and the guideframe are electrically and mechanically connected to the circuit board, and when an SFP module is plugged into a receptacle it is electrically and mechanically connected to the circuit board. Conventional SFP modules and receptacles, generally, carry data signals at rates up to 2.5 gigabits per second (Gbps).

More recently, new standards provide that the transceiver modules increase the data rate, which may create several problems that were not experienced previously. One problem is that the transceiver modules and the surrounding circuitry will generate significantly greater quantities of heat, which should be removed in order for the electronic components to survive long term. In at least some known receptacles, more than one heat sink is applied to facilitate dissipating the added heat. For example, a heat sink may be applied to both the top and bottom of the cage. However, when more than one heat sink is used it may be more difficult to position the receptacle and other components upon the circuit board.

Another problem is that the transceiver modules will generate increased quantities of electro-magnetic (EM) energy at very short wavelengths. As the EM energy at the short wavelengths increases, the potential exists for more EM energy to pass through gaps in the shielding of the receptacle or guideframe. It is desirable to shield or isolate the data signals from EMI to the extent practical.

There is a need to improve the design of a pluggable electronic module and receptacle in order to overcome present deficiencies and anticipated problems, among other things, due to higher data rates.

BRIEF DESCRIPTION OF THE INVENTION

In one embodiment, a receptacle assembly is provided that includes a housing that is configured to hold an electrical module. An energy transfer element, which is held by the housing, is positioned to engage the electrical module. The transfer element absorbs thermal energy produced by the electrical module. The receptacle assembly also includes a heat sink that is remotely located from the transfer element. A thermally conductive member extends between the heat sink and the transfer element to convey thermal energy therebetween.

Optionally, the thermally conductive member may be a heat pipe. The thermally conductive can also include a first channel portion that directly engages the transfer element and a second channel portion that directly engages the heat sink. Further, the thermally conductive member may include an intermediate portion that extends along a sidewall of the housing.

In another embodiment, another receptacle assembly is provided that includes a housing that is configured to hold an electrical module and includes a guideframe having a pair of stacked interior spaces. The interior spaces are configured to receive associated electrical modules. A transfer element is held by the housing and positioned between the interior spaces such that the transfer element directly engages at least one of the electrical modules. A thermally conductive member extends from the transfer element to convey thermal energy away from the transfer element.

Optionally, the thermally conductive member may be a heat pipe. The thermally conductive can also include a first channel portion that directly engages the transfer element and a second channel portion that directly engages the heat sink. Further, the thermally conductive member may include an intermediate portion that extends along a sidewall of the housing.

DETAILED DESCRIPTION OF THE INVENTION

Figure 1:
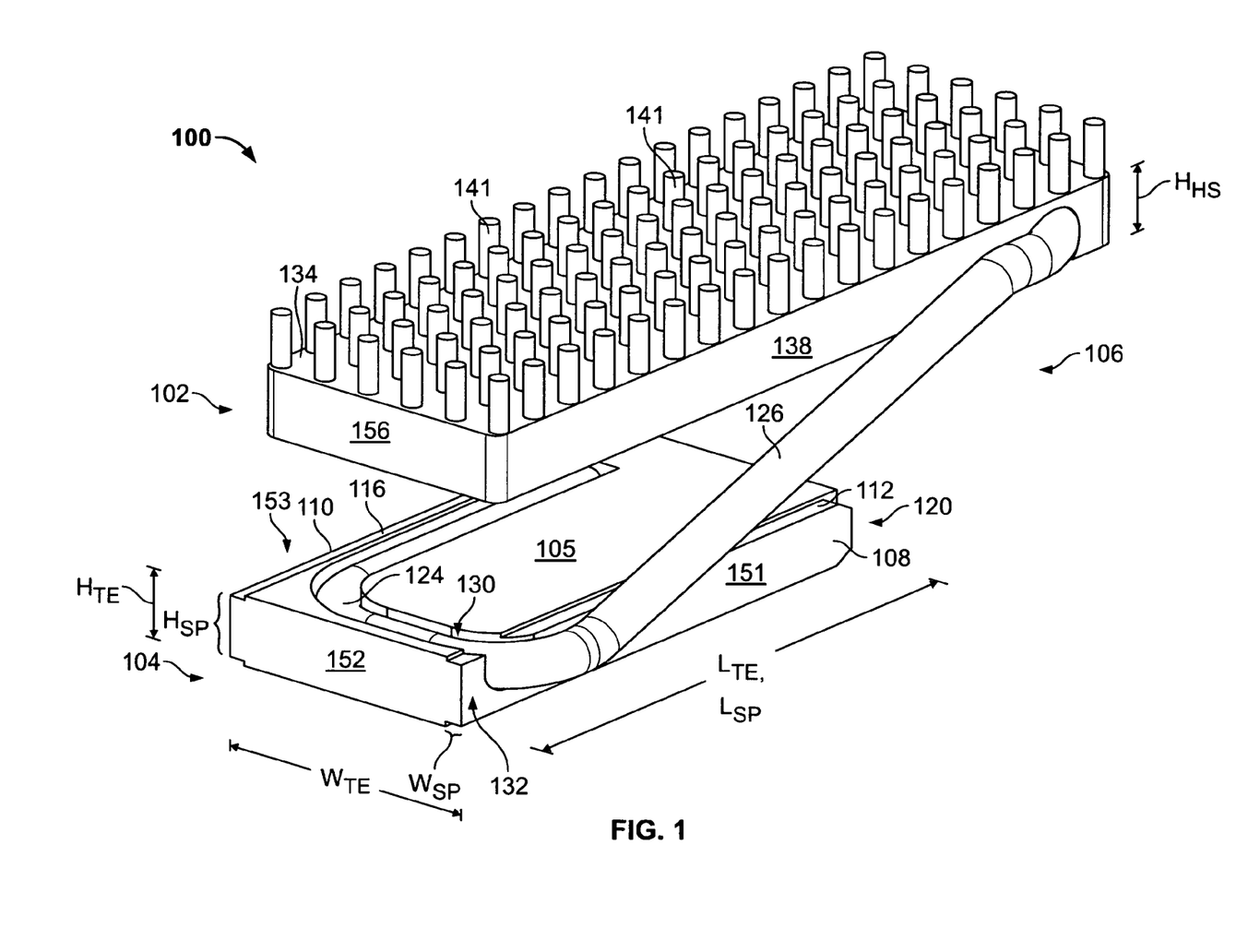
FIG. 1 is a perspective view of a heat transfer system formed in accordance with an embodiment of the present invention.
Figure 2:
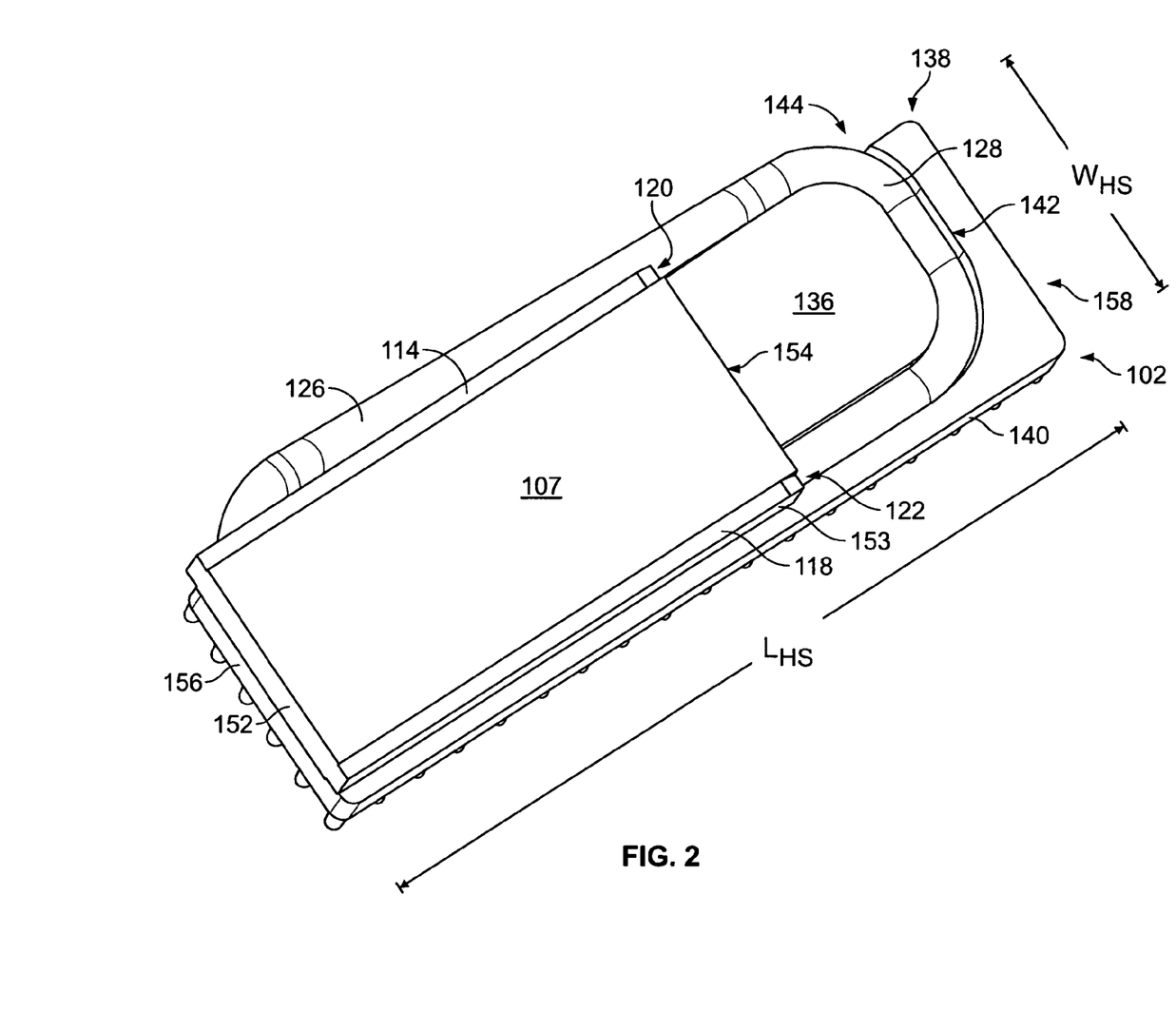
FIG. 2 is a bottom view of the heat transfer system shown in FIG. 1.

FIGS. 1 and 2 illustrate a heat transfer system 100 that includes a heat sink 102 coupled to an energy transfer element 104 via a thermally conductive bar 106. In the illustrative embodiment, transfer element 104, thermally conductive bar 106, and heat sink 102 are separate components bonded together to form heat transfer system 100. Alternatively, the thermally conductive member 106 may be integrally formed with heat sink 102 and/or transfer element 104. When installed into a receptacle assembly 200 (FIG. 3), the components of heat transfer system 100 operate to absorb, transfer, and dissipate thermal energy emitted from at least one electronic module.

Transfer element 104 may be formed from a thermally conductive metal alloy (e.g., copper alloy) and shaped into a substantially rectangular block having a width $W_{TE}$, a length $L_{TE}$, and a height $H_{TE}$. Transfer element 104 has a top surface 105, a bottom surface 107, a front surface 152, a rear surface 154, and side surfaces 151 and 153. In the illustrative embodiment, transfer element 104 has graded side portions 108 and 110. The term "graded," with respect to side portions 108 and 110, means that at least a portion of side surfaces 151 and 153 of transfer element 104 are leveled or cut out with respect to top surface 105 or bottom surface 107 allowing tabs or other protuberances to engage the leveled side portion. Side portions 108 and 110 may be substantially rectangular blocks having a width $W_{SP}$, a length $L_{SP}$, and a height $H_{SP}$, and may be integrally formed with transfer element 104. Alternatively, side portions 108 and 110 may be separately formed and coupled to transfer element 104. Side portion 108 includes a top surface 112 and a bottom surface 114, and side portion 110 includes a top surface 116 and a bottom surface 118. As shown in FIG. 1, height $H_{SP}$ is less than height $H_{TE}$, and length $L_{SP}$ is about equal to length $L_{TE}$. The difference in height ($H_{TE}-H_{SP}$) enables receptacle assembly 200, in one embodiment, to engage the top and bottom surfaces of graded side portions 108 and 110 with guiding tabs (e.g., guiding tabs 234, 236, and 238 in FIG. 3) and support transfer element 104 within the receptacle assembly without obstructing the path for a module assembly, such as 402 or 404 in FIG. 7, to be inserted.

Optionally, as shown in FIGS. 1 and 2, a rear end of graded side portions 108 and 110 is formed with beveled portions 120 and 122, respectively. Specifically, top and bottom surfaces 112 and 114, and 116 and 118, of side portions 108 and 110, respectively, slope inward toward each other. As will be described in detail below, beveled portions 120 and 122 and the surfaces of side portions 108 and 110 operate in conjunction with the guiding tabs to locate and support transfer element 104 within an internal cavity of the receptacle assembly.

Thermally conductive member 106 is formed from a thermally conductive metal alloy and configured to absorb thermal energy stored in transfer element 104 and carry the thermal energy away from transfer element 104. In one embodiment, thermally conductive member 106 is a heat pipe configured to make substantial contact with transfer element 104 and to transfer thermal energy to heat sink 102. Thermally conductive member 106 may include a transfer-element channel portion 124 that extends into or couples to an intermediate portion 126 which, in turn, extends into or couples to a heat-sink channel portion 128. Transfer element 104 includes a channel 130 having a configuration that is formed to fit or mate with channel portion 124 of thermally conductive member 106. By way of example, channel 130 is J-shaped having a concave surface with a similar size and shape as a contact surface of channel portion 124. Channel 130 begins at an opening 132 located in a front area of side portion 108 and extends substantially across the width $W_{TE}$ of transfer element 104 and then turns and extends substantially across the length $L_{TE}$ of transfer element 104. In alternative embodiments, channel 130 and channel portion 124 may have other configurations. For example, channel 130 may have a reverse S-shape spanning from opening 132 to the opposite rear portion of transfer element 104. Channel 130 may also be in the shape of a V, with the tip of the V reaching a rear portion of transfer element 104. As another example, channel 130 may be in the shape of the number 7.

Although FIGS. 1 and 2 illustrate heat transfer system 100 having only one thermally conductive member 106, other embodiments may have additional thermally conductive members. For example, heat transfer system 100 may have one conductive member that extends from the front portion of side surface 151 of transfer element 104 and engages a rear portion of side wall 138 of heat sink 102 (similar to FIG. 1). A second conductive member can extend from a rear portion of side surface 153 of transfer element 104 and engage a front portion of side wall 140 of heat sink 102. As another example, two heat pipes may extend from the same side of transfer element 104 and travel substantially upward (i.e., perpendicular to transfer element 104) to engage heat sink 102.

In operation, conductive member 106 absorbs thermal energy from transfer element 104 and transfers the thermal energy to heat sink 102 where the thermal energy is dissipated into the surrounding area. After exiting opening 132, intermediate portion 126 of conductive member 106 extends along a sidewall of receptacle assembly 200. Specifically, intermediate portion 126 traverses lengthwise to a rear portion of heat sink 102 and then extends through an opening 144 into a heat sink channel 142.

Heat sink 102 is formed of a thermally conductive metal alloy and shaped into a substantially rectangular block having a width $W_{HS}$, a length $L_{HS}$, and height $H_{HS}$. The width $W_{HS}$ may be substantially the same as width $W_{TE}$, and length $L_{HS}$ may be greater than length $L_{TE}$ giving heat sink 102 more surface area for dissipating the thermal energy. Heat sink 102 has a top surface 134, a bottom surface 136, side walls 138 and 140, a front surface 156, and a rear surface 158. A plurality of fins 141 extend from top surface 134 and are configured to transfer heat from heat sink 102 to the surrounding area. Channel 142 (FIG. 2) is formed to fit or mate with heat-sink channel portion 128 of thermally conductive member 106. In an embodiment, channel 142 is J-shaped having a concave surface with a similar size and shape as a contact surface of channel portion 128. Channel 142 begins at opening 144 located in a rear area of side wall 138 and extends substantially across the width $W_{HS}$ and then turns and extends substantially across the length $L_{HS}$ of transfer element 104. Alternatively, channel 142 and channel portion 128 may have any configuration. For example, channel 142 may have a S-shape spanning from opening 144 to the opposite front portion of heat sink 102. Channel 142 may also be in the shape of a V, with the tip of the V reaching a front portion of heat sink 102. As another example, channel 142 may have a spiral shape. Although channel 142 of heat sink 102 has a size and shape similar to channel 130 of transfer element 104, channels 142 and 130 may have different configurations.

Figure 3:
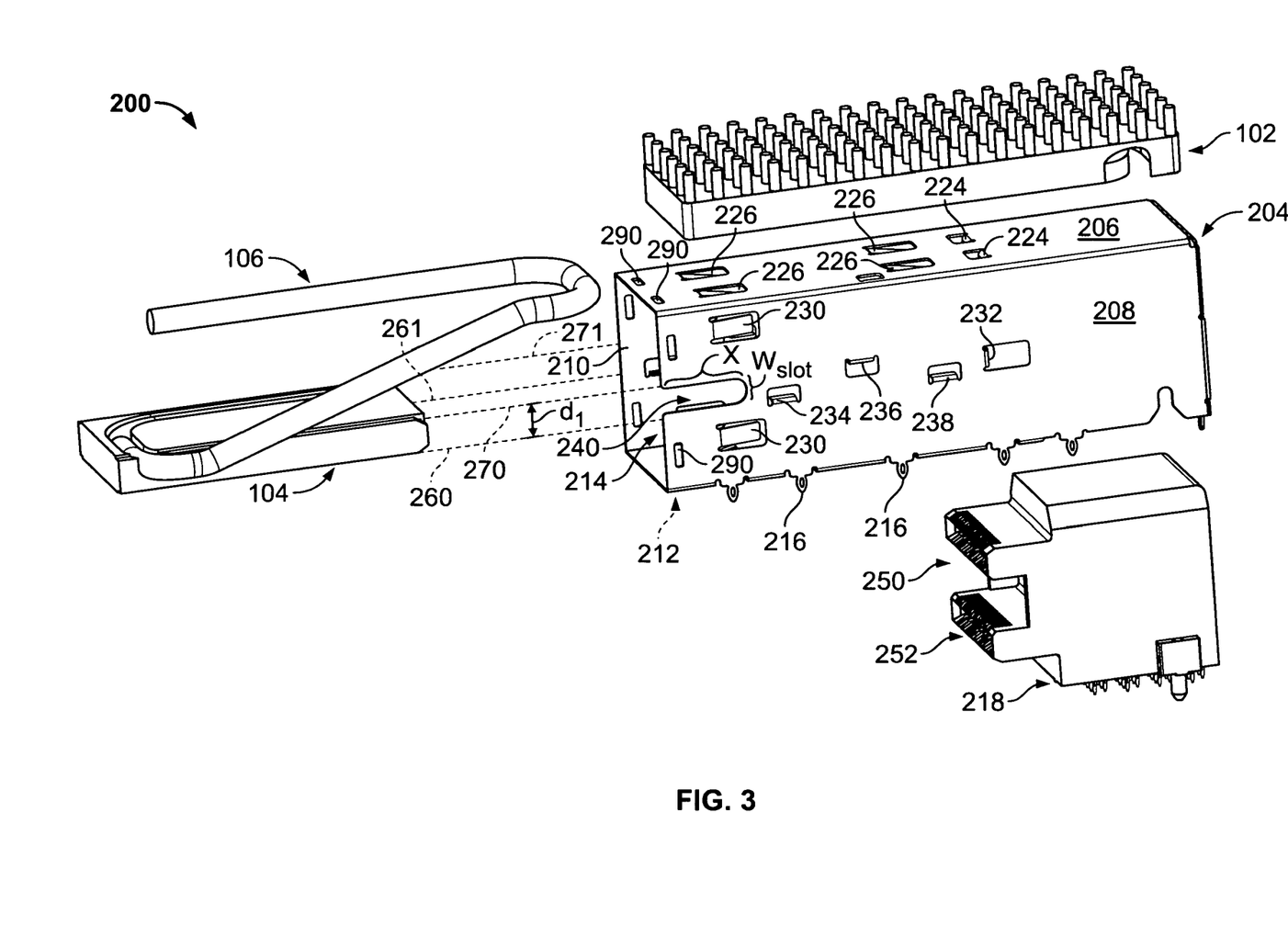
FIG. 3 is an exploded view of a receptacle assembly formed in accordance with an embodiment of the present invention.
Figure 4:
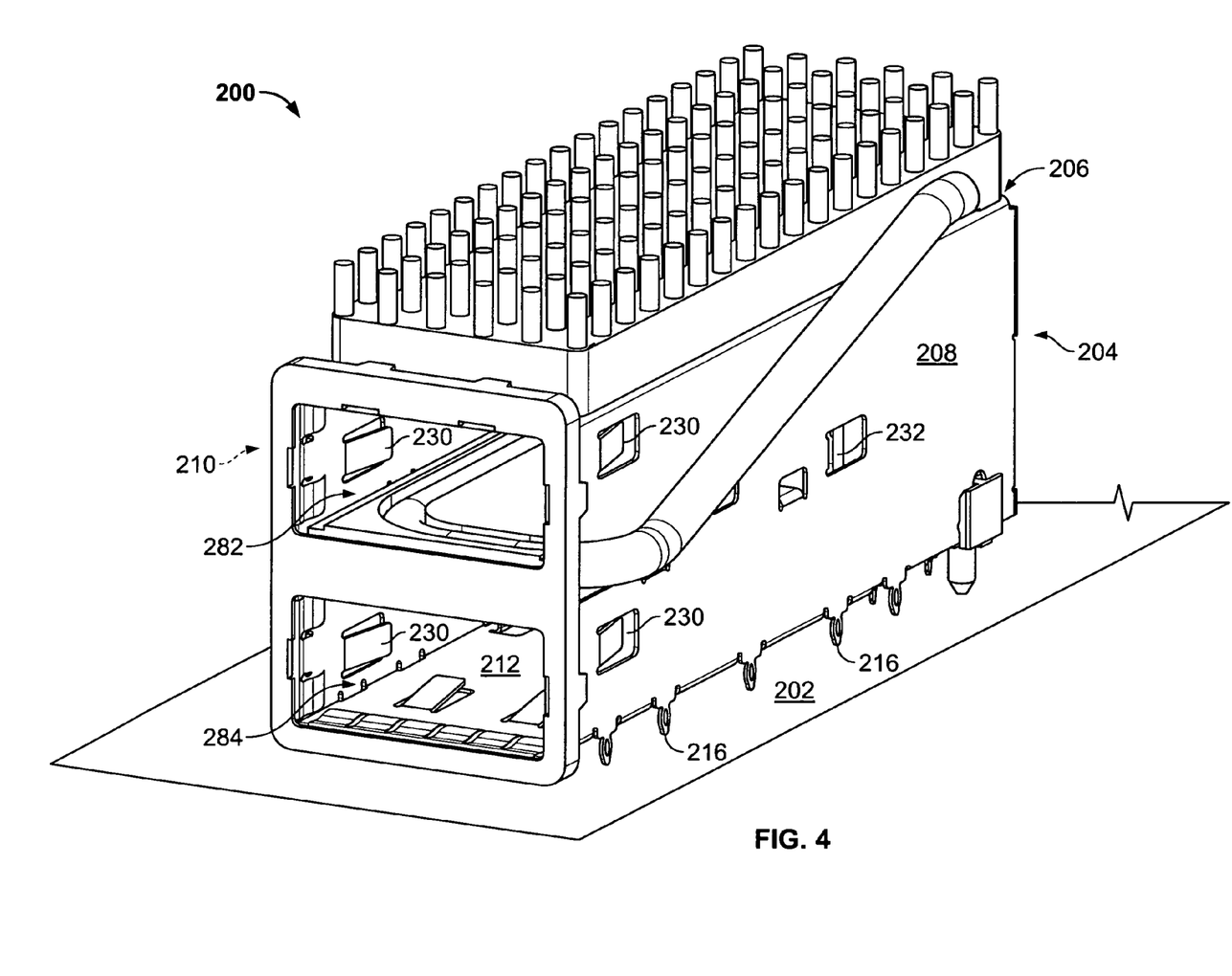
FIG. 4 is a front-right perspective view of the receptacle assembly shown in FIG. 3 assembled.
Figure 5:
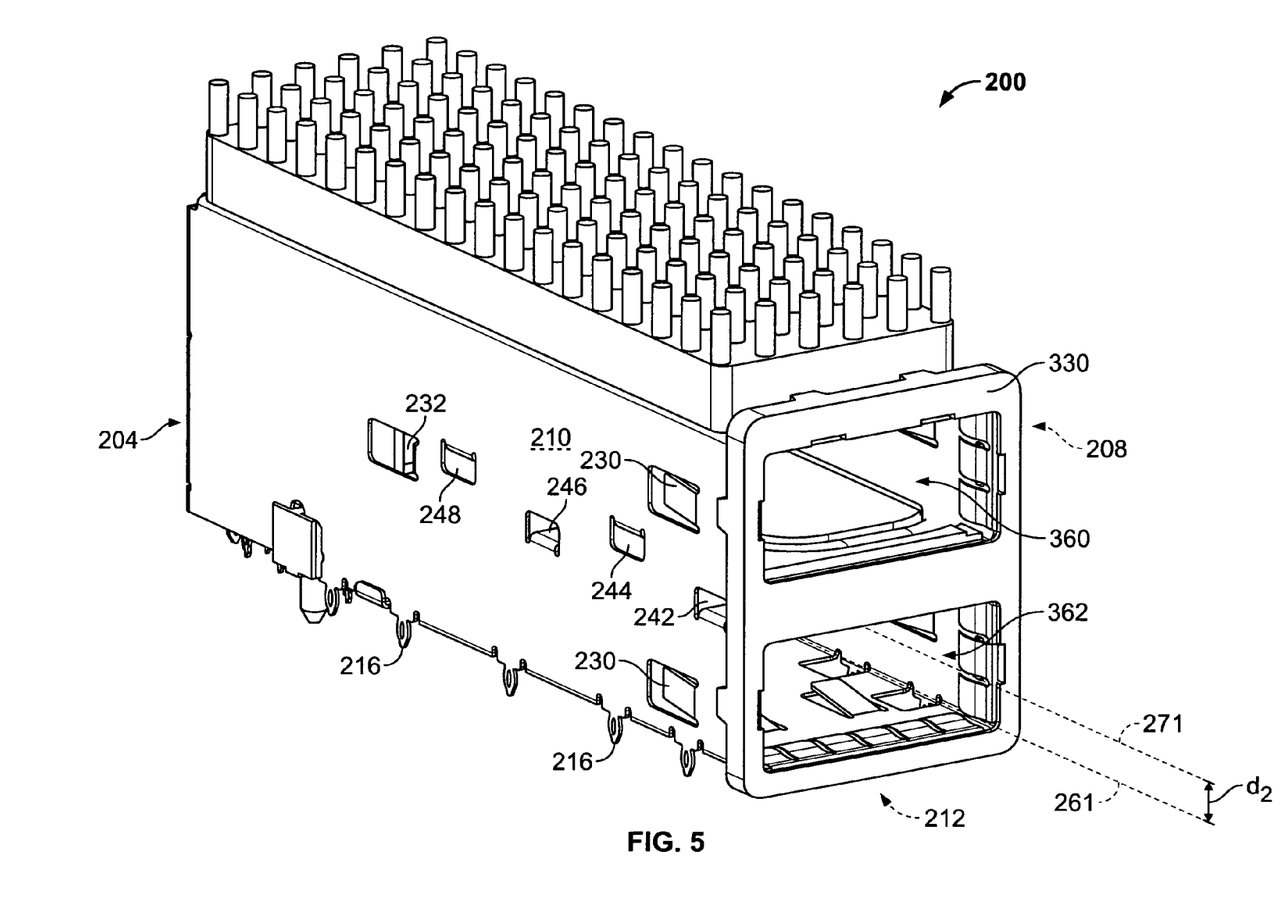
FIG. 5 is a front-left perspective view of the receptacle assembly shown in FIG. 4.

FIG. 3 is an exploded perspective view of a receptacle assembly 200 used with heat transfer system 100, and FIGS. 4 and 5 are perspective views of the constructed receptacle assembly 200. Assembly 200 includes a housing or guide-frame 204 that may be stamped and formed from a metal body that defines a shell having a top wall 206, sidewalls 208 and 210, and a bottom wall 212. Walls 206-212 define an interior cavity 214 for receiving at least one module assembly and transfer element 104 of heat transfer system 100. Assembly 200 includes a receptacle connector 218 that is received through an opening (not shown) in bottom wall 212. Receptacle connector 218 is mounted onto host board 202 along with guideframe 204, but separated from the conductive surface of host board 202. In one embodiment, receptacle connector 218 includes an upper slot 250 and a lower slot 252 where each receive an edge of a circuit board that is carried by a module assembly 402, 404, respectively (FIG. 7) when the module assembly is fully installed in guideframe 204, thereby electrically connecting the module assembly to the host equipment. In alternative embodiments, receptacle connector 218 may include only one slot or more than two.

Heat sink 102 is located remotely from the module assembly (not shown in FIGS. 3-5). The term "remote," as used herein, means that the two objects do not make substantial direct contact for direct heat transfer. For example, although some incidental heat transfer may occur from minor contact, the object with more stored thermal energy transfers that energy by other means. In an embodiment, heat sink 102 is spaced apart from the module assembly such that the two objects do not make contact. Heat sink 102 may be located on a top wall 206 of receptacle assembly 200 and secured or bonded to the surface of top wall 206. For example, a thermally conductive adhesive may be coated on bottom surface 136 of heat sink 102 and/or on the top of wall 206. Alternatively, heat sink 102 is soldered or mechanically affixed to the receptacle assembly 200. Optionally, the heat sink 102 may not be located on top wall 206 but positioned remotely from the receptacle assembly 200.

As shown in FIG. 4, receptacle assembly 200 is mounted to a host circuit board 202, which, in turn, is mounted in a host system such as a router or computer (not shown).

When a module assembly is inserted into receptacle assembly 200, guideframe 204 provides conductive walls on all sides thereof. Sidewalls 208 and 210 include compliant pins 216 that are received within through-holes of the host board 202 and provide a conductive path to ground of an equipment chassis when receptacle assembly 200 is mounted therein. Host board 202 includes a conductive surface and is formed as a sheet to underlie receptacle assembly 200 in order to enhance the electromagnetic interference shielding.

The guideframe 204 is configured to hold transfer element 104 within interior cavity 214. Transfer element 104 and guideframe 204 define stacked interior spaces 282 and 284 (shown in FIG. 3). Upper interior space 282 and lower interior space 284 are each configured to receive a module assembly, such as module assemblies 402 and 404 in FIG. 7. Top wall 206 of guideframe 204 supports heat sink 102. Although the Figures illustrate heat sink 102 positioned on top wall 206, in alternative embodiments, heat sink 102 may not be on top wall 206. For example, heat sink 102 may be placed in a remote location from receptacle assembly 200. In another embodiment, a plurality of receptacle assemblies 200 may each have a thermally conductive member 106 that carries thermal energy away from the respective receptacle assembly 200 to a common heat sink that is located remotely from the plurality of receptacle assemblies 200.

A rear portion of top wall 206 includes a pair of positive stops 224 in the form of tabs that extend slightly downward into cavity 214 (or interior space 282). The stops 224 engage a rear surface of the module assembly to prevent the module assembly from passing rearwardly through guideframe 204 beyond a predetermined distance. Top wall 206 also includes a plurality of spring elements 226, which may be rectangular tabs punched from top wall 206 and bent inwardly into interior space 282. As shown in FIG. 3, a substantially parallel pair of spring members 226 are positioned in the midsection of top wall 206 and another substantially parallel pair of spring members 226 are positioned in the front portion of top wall 206. When a module assembly is inserted into guideframe 204, spring members 226 contact the outer surfaces of the module assembly and bias the assembly toward transfer element 104. As such, spring members 226 ensure intimate contact between the module assembly surface and the respective surface of transfer element 104 for facilitating heat transfer between the module assembly and element 104. Also, each pair of spring members 226 may operate with positive stops 224 to engage and locate a module assembly into a predetermined position that is conducive for establishing an electrical connection between a circuit board of module assembly 402 and upper slot 250 of receptacle connector 218.

Although not shown in FIGS. 3-5, bottom wall 212 of the illustrative embodiment has a similar configuration of spring members 226 and positive stops 224, which project into interior space 284. Similarly, spring members 226 of bottom wall 212 contact the outer surfaces of the module assembly and bias the assembly toward transfer element 104 to ensure intimate contact between the module assembly surface and the respective surface of transfer element 104. The spring members 226 of bottom wall 212 may also facilitate engaging and locating a lower module assembly (e.g., module assembly 404 in FIG. 7) into a predetermined position that is conducive for establishing an electrical connection between a circuit board of module assembly 404 and lower slot 252 of receptacle connector 218.

Moreover, each of sidewalls 208 and 210 can include a pair of substantially parallel latch elements 230 positioned in the front portion thereon. Each latch element 230 is configured to engage and locate a module assembly (e.g., 402 or 404 in FIG. 7) when the module assembly is inserted into guideframe 204. Furthermore, each sidewall 208 and 210 can include a positive stop 232 and a plurality of guiding tabs for directing transfer element 104 into a predetermined position. Positive stop 232 is formed from a tab that extends into cavity 214. Positive stops 232 engage rear surface 154 of transfer element 104 to prevent element 104 from extending beyond a predetermined distance into cavity 214. In the illustrative embodiment, sidewall 208 includes three guiding tabs 234, 236, and 238 that each extend slightly into cavity 214 forming a substantially flat surface that is perpendicular with sidewall 208. Guiding tabs 234 and 238 are substantially aligned forming a support line 260 for bottom surface 114 of side portion 108. Guiding tab 236 forms a surface line 270 that is substantially parallel with support line 260 of guiding tabs 234 and 238. The support line 260 and surface line 270 are located a distance $d_1$ apart. Distance $d_1$ is substantially equal to or slightly greater than the height $H_{SP}$ of transfer element 104.

A front portion of sidewall 208 also defines a slot 240 for receiving a portion of the thermally conductive member 106 that exits opening 132 from transfer element 104. Slot 240 has a depth X from the front edge of sidewall 208 and has a width $W_{SLOT}$ that is wide enough for slot 240 to receive thermally conductive member 106. Slot 240 may include a concave edge portion that complements the shape of conductive member 106.

Although sidewall 210 does not include a slot for receiving a thermally conductive member, a slot may be included in alternative embodiments. As shown in FIG. 5, sidewall 210 includes four guiding tabs 242, 244, 246, and 248, where each guiding tab extends slightly into cavity 214 forming a substantially flat surface that is perpendicular with sidewall 210. Guiding tabs 242 and 246 are substantially aligned forming a support line 261 for bottom surface 118 of side portion 110 of transfer element 104. Guiding tabs 244 and 248 form a surface line 271 that is substantially parallel with support line 261. Lines 261 and 271 are located distance $d_2$ apart.

The rectangular volume of space defined by lines 260, 261, 270, and 271 represents the path which transfer element 104 may move through when element 104 is inserted into guideframe 204. In the illustrative embodiment, if transfer element 104 is not within this space, beveled portions 120 and 122 engage the guiding tabs, thus directing element 104 to be substantially within the volume of space defined by lines 260, 261, 270, and 271. The inward surfaces of guiding tabs 234, 236, 238, 242, 244, 246, and 248 make slidable contact with the corresponding surfaces of graded side portions 108 and 110 until rear surface 154 engages positive stops 232 of sidewalls 208 and 210. Graded side portions enable an unobstructed path for module assemblies that are later inserted into receptacle assembly 200.

Figure 6:
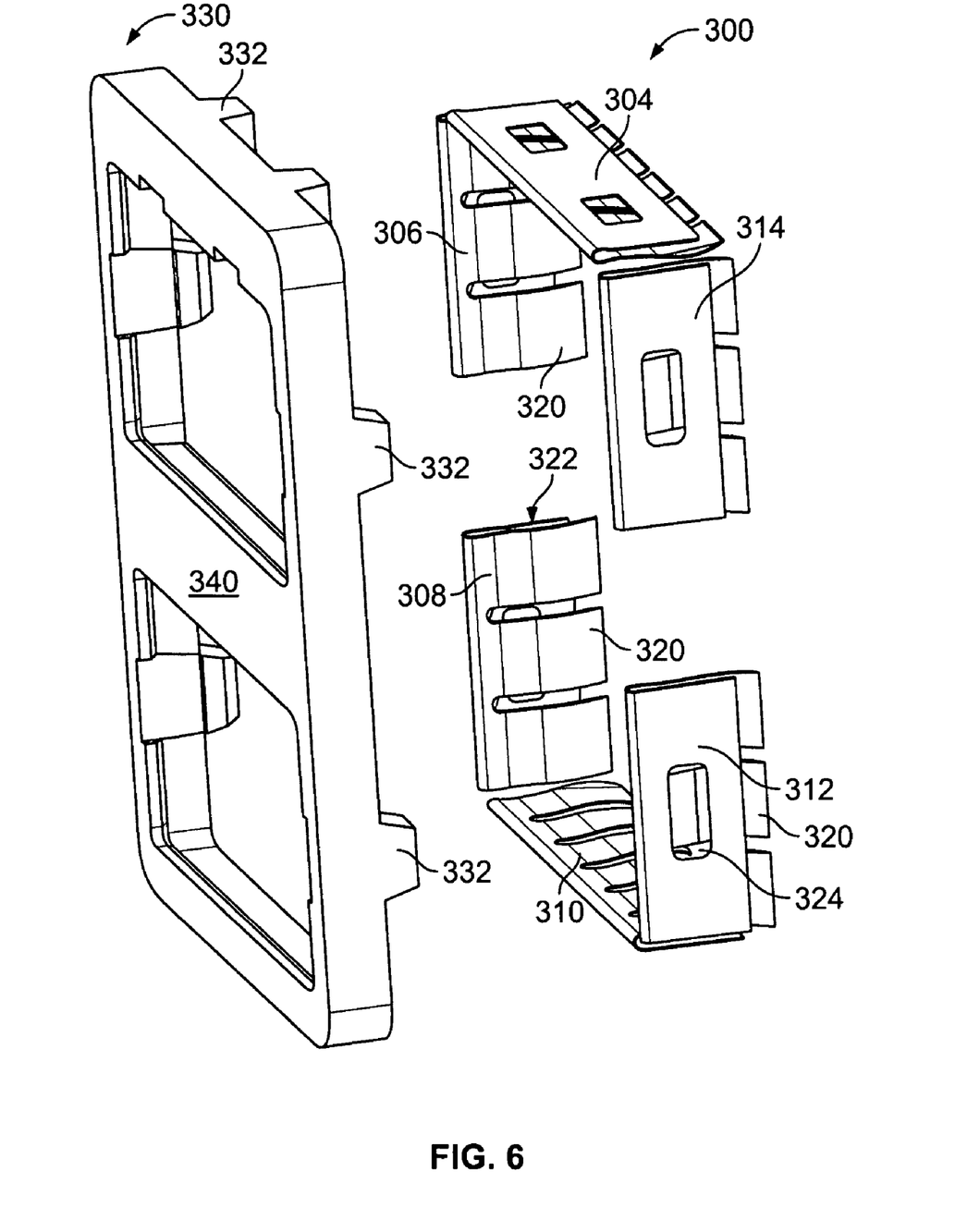
FIG. 6 is an exploded perspective view of a collar assembly used with the receptacle assembly of FIG. 4.

FIG. 6 illustrates an exploded perspective view of an EMI shielding collar assembly 300 for shielding a front end of guideframe 204 to prevent undesirable electromagnetic interference from leaking through the front of receptacle assembly 200. Electrically conductive gasket 304 is installed onto the front edge of top wall 206. Gaskets 306 and 308 are installed onto the front edge of sidewall 210. Gasket 310 is installed onto the front edge of bottom wall 212, and gaskets 312 and 314 are installed onto the front edge of sidewall 208. Each gasket 304, 306, 308, 310, 312, and 314 has resilient straps 320 of an arched configuration that contact the walls of the installed module assemblies to provide a barrier for EMI. The gaskets 304, 306, 308, 310, 312, and 314 are adapted to reduce any gaps between the module assemblies and guideframe 204 in order to prevent leakage of EMI. Such EMI may be generated internally by the module assemblies, or externally by devices of the host equipment. The gaskets 304, 306, 308, 310, 312, and 314 are connected to electrical ground through guideframe 204 which has pins 216 that are connected to ground on the host board 202. Thus, EMI which impinges on guideframe 204 or on gaskets 304, 306, 308, 310, 312, and 314 is effectively directed to electrical ground.

The gaskets 304, 306, 308, 310, 312, and 314 are fabricated from a conductive material such as thin copper alloy sheets. Each strap 320 is curved inwardly forming a clip section 322. When gaskets 304, 306, 308, 310, 312, and 314 are coupled to their respective wall, clip section 322 hooks over the respective wall edge and couples the gasket to the wall. Further, each gasket 304, 306, 308, 310, 312, and 314 includes at least one opening 324. Openings 324 correspond to the front edge openings of their respective sidewall. Specifically, the gaskets 304, 306, 308, 310, 312, and 314 are attached to the front end via engagement openings 324 that align with openings 290 in the front end of guideframe 204 (shown in FIG. 3).

Collar assembly 300 also includes a collar 330 having retaining pins or tabs 332 that project inward. Collar 330 receives guideframe 204 with coupled gaskets 304, 306, 308, 310, 312, and 314, wherein each tab 332 extends through openings 324 and openings 290 and further secures gaskets 304, 306, 308, 310, 312, and 314 to the front end of guideframe 204. Collar 330 includes a flat and smooth outer surface 340 that provides an uninterrupted and continuous EMI shield. The collar 330 is fabricated from a conductive material, such as aluminum or zinc in a known die-casting operation. Optionally, collar 330 may be fabricated from other known materials and according to other processes and techniques familiar to those in the art. Collar 330 is formed into a complementary shape to the front end of guideframe 204. As shown in FIG. 5, collar assembly 300 defines two openings 360 and 362 for receiving a module assembly.

Figure 7:
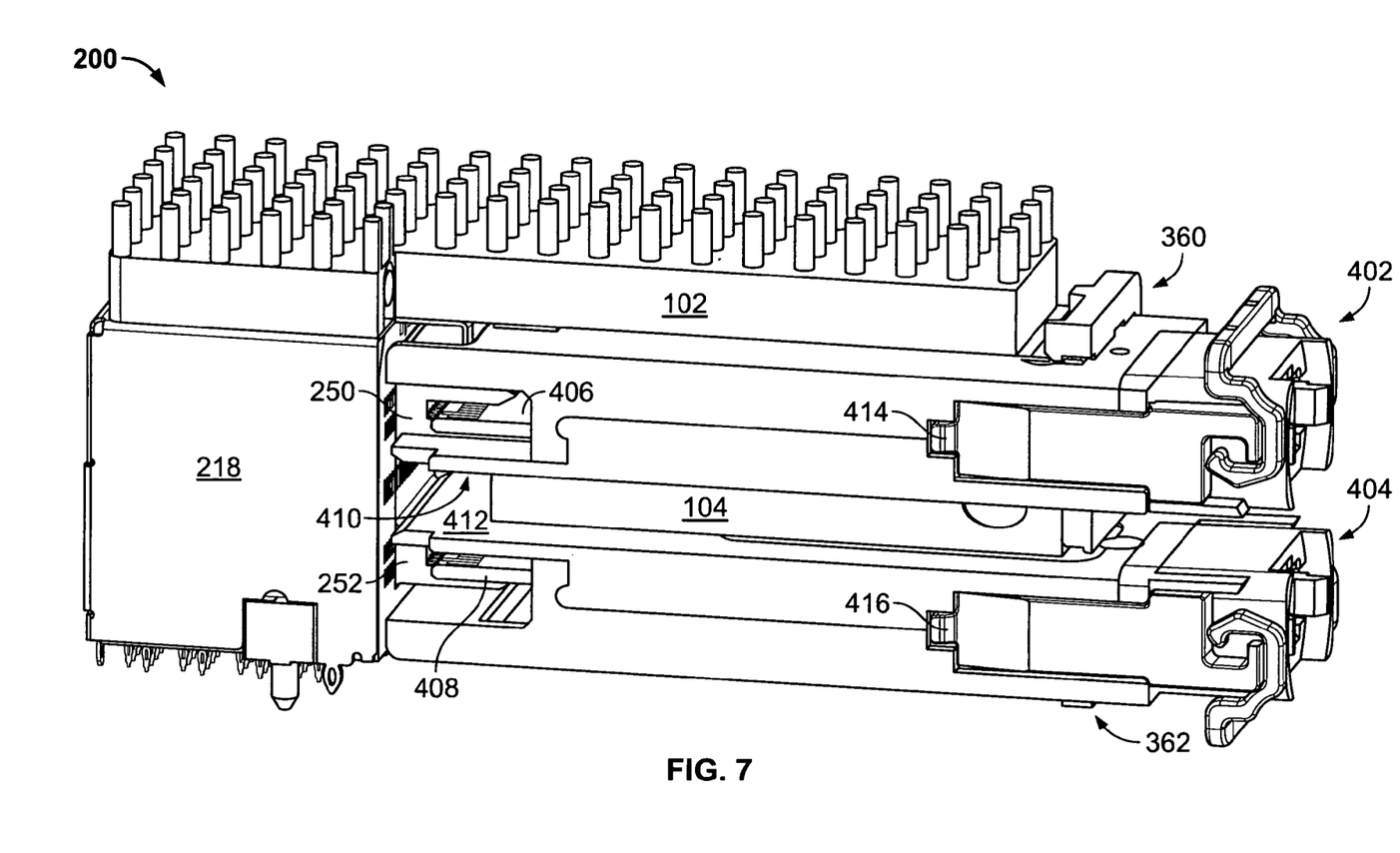
FIG. 7 is a side perspective view of the receptacle assembly shown in FIG. 4 with a portion of the assembly broken away.
Figure 8:
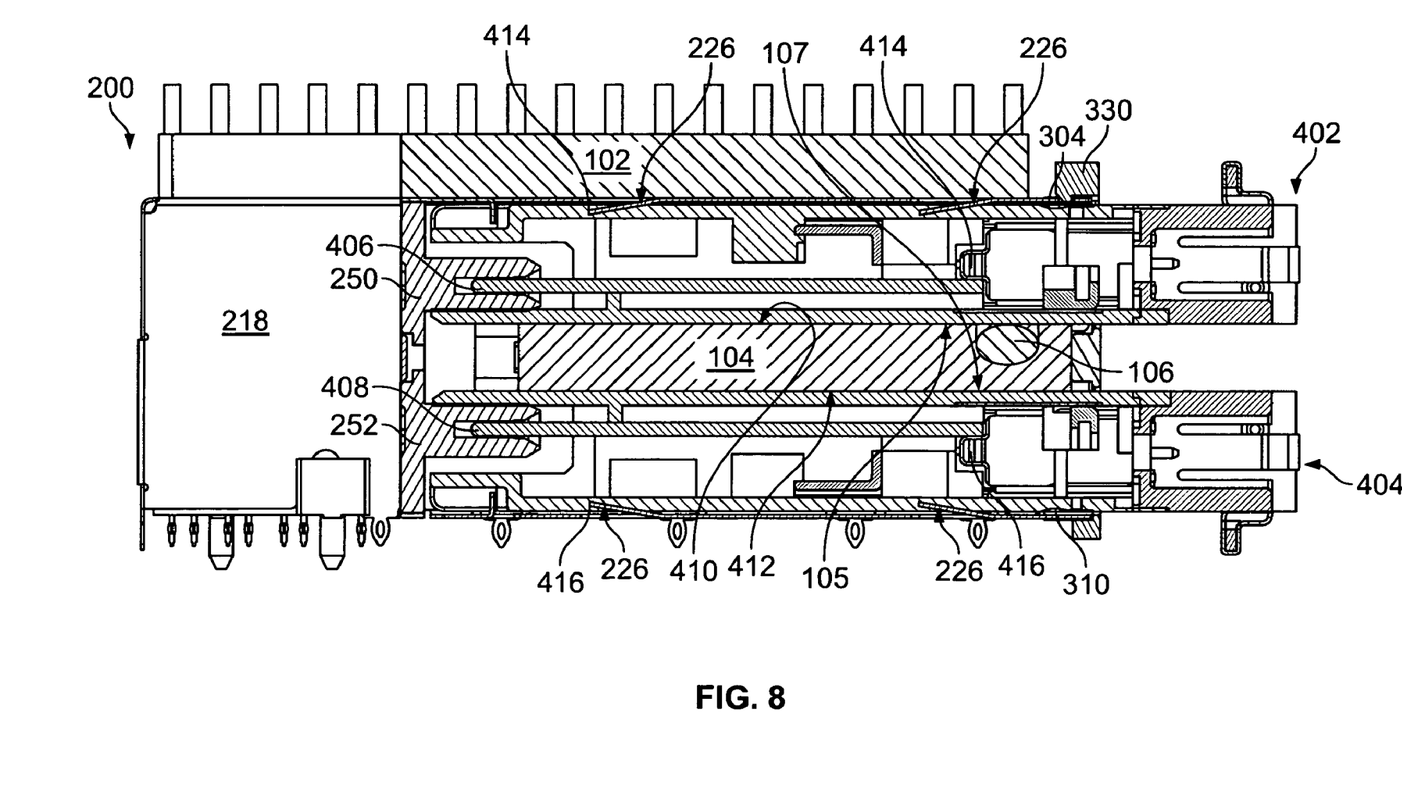
FIG. 8 is a side cross-sectional view of the receptacle assembly shown in FIG. 4.

FIGS. 7 and 8 illustrate the constructed receptacle assembly 200 having an upper module assembly 402 and a lower module assembly 404 inserted into openings 360 and 362, respectively. Module assembly 402 includes a circuit board 406, a heat transfer surface 410, and recessed portions 414 for receiving latch elements 230. Similarly, module assembly 404 includes a circuit board 408, a heat transfer surface 412, and recessed portions 416 for receiving latch elements 230. When module assemblies 402 and 404 are engaged with receptacle assembly 200, heat transfer surfaces 410 and 412 are in substantial contact with surfaces 105 and 107, respectively, of transfer element 104.

Receptacle assembly 200 receives module assemblies 402 and 404 through openings 360 and 362, respectively. The outer surfaces of assemblies 402 and 404 engage with the inner surfaces of receptacle assembly 200 so that module assemblies 402 and 404 are placed into predetermined engagement positions. Specifically, gaskets 314, 304, and 306 create initial contact with the outer surfaces of module assembly 402 when inserted. As assembly 402 progresses through opening 360, spring member 226 and latch element 230 first deflect outwardly with resistance against the outer surfaces of assembly 402 and then resile inwardly to engage recessed portions 414 at or prior to assembly 402 reaching positive stops 224. Thus, assembly 402 is placed into a predetermined position such that circuit board 406 is positioned into slot 250 making an electrical and physical connection. Similarly, gaskets 308, 310, and 312 create initial contact with the outer surfaces of module assembly 404 when inserted. As assembly 404 progresses through opening 362, spring member 226 and latch element 230 first deflect outwardly with resistance against the outer surfaces of assembly 404 and then resile inwardly to engage recessed portions 416 at or prior to assembly 404 reaching positive stops 224. Thus, assembly 404 is placed into a predetermined position such that circuit board 408 is positioned into slot 252 making an electrical and physical connection. Moreover, heat transfer surfaces 410 and 412 are positioned to make substantial contact with surfaces 105 and 107 of transfer element 104, respectively. Thermal energy created by assemblies 402 and 404 is at least partially absorbed by transfer element 104 and transferred to heat sink 102 via thermally conductive member 106.

Heat transfer system 100 enables a receptacle assembly, such as receptacle assembly 200, to operate with one heat sink or no heat sink in substantial contact with the receptacle assembly. Thus, electronic equipment can be manipulated or changed into different configurations using embodiments of the present invention.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A receptacle assembly comprising:
  a housing including an interior space that is sized and shaped to receive a pluggable electrical module and having an opening that provides access to the interior space such that the electrical module is movable through the opening into and out of the interior space, the housing comprising a plurality of walls having the interior space therebetween, the walls including a pair of opposing sidewalls having guiding tabs extending therefrom, one of the walls including a wall opening;
  an energy transfer element held by the housing and positioned to engage the electrical module, the transfer element absorbing thermal energy produced by the electrical module, the transfer element having opposite side portions that are each shaped to directly engage the guiding tabs of a corresponding sidewall, the guiding tabs being at most flush with an engagement surface of the transfer element so that the electrical module physically contacts the engagement surface of the transfer element;

a heat sink remotely located from the transfer element; and a thermally conductive member extending through the wall opening and being physically connected to the heat sink and the transfer element to convey thermal energy therebetween;

wherein the housing holds the heat sink and the transfer element apart from one another with the interior space therebetween such that the electrical module is located between the heat sink and the transfer element when inserted into the interior space.

2. A receptacle assembly in accordance with claim 1, wherein the thermally conductive member extends around at least a portion of the electrical module from the heat sink to the transfer element.

3. A receptacle assembly in accordance with claim 1, wherein the thermally conductive member comprises an intermediate portion extending along one of the opposing sidewalls, said one of the opposing sidewalls having the wall opening and being positioned between the intermediate portion and the interior space.

4. A receptacle assembly in accordance with claim 1, wherein at least one of the heat sink and the transfer element includes a channel that receives the thermally conductive member.

5. A receptacle assembly in accordance with claim 1, wherein the interior space is a first interior space, the opening is a first opening, and the electrical module is a first electrical module, the housing and the transfer element defining a second interior space that is sized and shaped to receive a second electrical module through a second opening of the housing, the second interior space being stacked with respect to the first interior space, the transfer element being held within the housing at a position between the first and second interior spaces, the transfer element configured to absorb thermal energy from the first and second electrical modules.

6. A receptacle assembly in accordance with claim 1, wherein the housing includes a top wall that holds the heat sink, the top wall located between the heat sink and the interior space, the top wall being continuous and extending between the heat sink and the interior space to physically separate the heat sink and the interior space from one another.

7. The receptacle assembly in accordance with claim 1 further comprising a receptacle connector located within the housing and configured to electrically connect with the electrical module, the interior space being sized and shaped to direct the electrical module to the receptacle connector when inserted therein.

8. The receptacle assembly in accordance with claim 1 wherein the thermally conductive member is directly connected to the heat sink and the transfer element to convey thermal energy therebetween.

9. The receptacle assembly in accordance with claim 1 wherein the thermally conductive member is integrally formed with at least one of the transfer element and the heat sink.

10. The receptacle assembly in accordance with claim 1 wherein the wall opening is a slot.

11. The receptacle assembly in accordance with claim 1, wherein the thermally conductive member comprises a heat pipe.

12. A receptacle assembly comprising:

a housing comprising a guideframe having vertically stacked interior spaces that are sized and shaped to receive corresponding pluggable electrical modules, the housing having respective openings where the corresponding electrical modules are moved therethrough into and out of the corresponding interior spaces, the guideframe comprising a plurality of walls having the interior spaces therebetween, the walls including a pair of opposing sidewalls having guiding tabs extending therefrom, one of the walls including a wall opening;

an energy transfer element held by the housing between a pair of the interior spaces, the transfer element being located between the corresponding electrical modules and absorbing thermal energy produced by the corresponding electrical modules, the transfer element having opposite side portions that are each shaped to directly engage the guiding tabs of a corresponding sidewall, the transfer element also having opposite engagement surfaces, each guiding tab being at most flush with a corresponding engagement surface so that the electrical modules physically contact the engagement surfaces of the transfer element; and a thermally conductive member being physically connected to the transfer element, the thermally conductive member extending through the wall opening from the transfer element to convey thermal energy away from the transfer element.

13. A receptacle assembly in accordance with claim 12, wherein the thermally conductive member comprises a heat pipe.

14. A receptacle assembly in accordance with claim 12, further comprising a heat sink located remotely from the housing, wherein the thermally conductive member is shaped to carry the thermal energy away from the housing to the heat sink.

15. A receptacle assembly in accordance with claim 12, wherein the transfer element includes a channel that receives the thermally conductive member.

16. A receptacle assembly in accordance with claim 12 further comprising a heat sink located remotely from the transfer element, the thermally conductive member conveying thermal energy from the transfer element to the heat sink.

17. The receptacle assembly in accordance with claim 12 wherein the wall opening is a slot.

18. The receptacle assembly in accordance with claim 12 wherein one of the opposing sidewalls includes the wall opening.

19. The receptacle assembly in accordance with claim 12 further comprising a heat sink, wherein one of the walls is a top wall that holds the heat sink, the top wall located between the heat sink and one of the interior spaces, the top wall being continuous and extending between the heat sink and said one of the interior spaces to physically separate the heat sink and said one of the interior spaces from one another.

* * * * *